3,395,234
THIOCARBAZATE METHODS AND COMPOSITIONS FOR CONTROLLING PLANT RUST
Thomas R. Hopkins, Johnson County, James R. Thornton, Prairie Village, and Jean R. Epperly, Overland Park, Kans., assignors, by mesne assignments, to Gulf Oil Corporation, Pittsburgh, Pa., a corporation of Pennsylvania
No Drawing. Filed Sept. 29, 1959, Ser. No. 843,037
28 Claims. (Cl. 424—323)

This invention relates to chemotherapeutic compositions and methods of treating plants. More specifically, this invention relates to the treatment of plants with a chemotherapeutic composition to control plant rust, and particularly rust of cereal plants.

Plant chemotherapy is the chemical therapy or chemical treatment of infections caused by the presence of an invading pathogen in a plant. Dimond et al., Phytopath. 42, 72–6, (1952), defined plant chemotherapy as "the control of disease by compounds that through their effect on the host or pathogen, reduce or nullify the effect of the pathogen after it has entered the plant."

The plant rusts, which are characterized by their orange, red, brown, or in the latter stages, black color, are found in nearly every place that plants are grown. Plants such as wheat, oats, barely, rye, beans and even certain wild grasses, and fruit, such as apples, may be attacked by rust fungi. The rust, which is caused by a very small parasitic fungus that enters the plant through its breathing pores, may appear on the leaves or stems of the plant. As the plant grows, the rust fungus develops pustules that contain countless reddish spores which are easily blown about by the wind, thus infecting other plants. During warm, moist weather, conditions which are very favorable for the development of the rust, the pustules may develop as often as every week, rapidly spreading the rust. The plant is damaged by the growth of the rust fungus and by the development of the spores since the rust fungi also utilize the water and nutrient materials required by the plant for normal growth. The rust may cause very extensive damage to the plane as well as kernals in the case of cereal plants. The size and number of kernels may be reduced and, in some cases, the kernels may be badly shriveled. When the young plants become heavily rusted the entire plant may be weakened and dwarfed, reducing the yield by as much as 90 percent.

The continuing efforts to develop rust-resistant strains of plants attests to the problem which rust presents. Many suggestions have been made for the control or alleviation of rust on plants. One of these is elimination of plants which may act as a host for the rust fungi during its development, such as the barberry bush. This and other proposals have not solved the problem. It is apparent that there is a need for an effective chemical composition to control dust readily and economically.

The object of this invention is to provide effective chemotherapeutic compositions and methods for the control of plant rust. A further object of this invention is to provide effective chemotherapeutic compositions and methods for the eradication of cereal rust. A still further object is to provide effective chemotherapeutic compositions and methods for the protection of cereal plants from further attack by the rust fungus. Further objects will be apparent from the following disclosure.

According to the present invention it has been found that by supplying a plant subject to attack by plant rust fungi with a thiocarbazate at a location where the plant may adsorb the compound, the plant will be protected from attack by plant rust fungi. By contacting a growing cereal plant infected with a plant rust fungus with a thiocarbazate, the rust will be eradicated without harm to the plant and the plant will thereby be protected against further attack by the rust fungus. By "supplying" is meant, generally, applying a thiocarbazate to the surface of a plant or to soil in which the plant is growing or will be growing.

The thiocarbazates which will eradicate, or protect against, fungi in plants can be represented by the formula

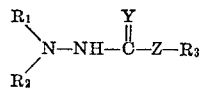

wherein $R_1$ is hydrogen, a lower alkyl such as methyl, ethyl, propyl, isopropyl, pentyl and octyl, $R_2$ is phenyl, a halophenyl group such as 4-chlorophenyl and 3-bromophenyl, 3-nitrophenyl and lower alkylphenyl groups such as 4-methylphenyl and 2-ethylphenyl groups, $R_3$ is phenyl, phenylhydrazonium or a lower alkyl group such as methyl, ethyl, propyl, isopropyl, hexyl, octyl, and substituted alkyls such as haloalkyls and 1-methyl-2-ketopropyl groups, Y is sulfur or oxygen, Z is sulfur or oxygen and at least one of Y and Z is sulfur. The compounds in which $R_2$ represents a 3-nitrophenyl group are surprisingly much more active against cereal rust fungi than similar compounds in which the nitro group is present on the phenyl group in the 2 and/or 4 positions.

The thiocarbazates of this invention suitable for use against plant rust are thus the dithiocarbazates having

linkage, the thionocarbazates having the

linkage, and the thiolcarbazates having the

linkage.

Many of the thiocarbazates are known in the art and those which are not can be readily prepared by published procedures. One convenient process of preparing the thiolcarbazates is to react the appropriate hydrazine with an appropriate ester of the appropriate chlorothiolcarbonic acid. This reaction can be represented as follows:

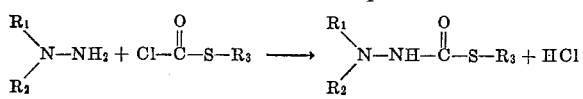

wherein $R_1$, $R_2$ and $R_3$ have the significance assigned above. The reaction is generally effected by bringing the reactants together in the presence of an organic solvent, and advisably also in the presence of a base, such as pyridine or an excess of the hydrazine, to neutralize hydrogen chloride as it is evolved in the reaction. The product is recovered from the reaction mixture by conventional manipulative steps.

The chlorothiolcarbonates which can be used as intermediates in preparing the thiolcarbazates are readily prepared by the reaction of the appropriate mercaptan with excess phosgene.

The dithiocarbazates can be prepared by reacting an appropriately substituted hydrazine with carbon disulfide and an inorganic base, such as potassium hydroxide, to form the potassium salt of the 3-substituted dithiocarbazic acid which is then reacted with the appropriate organic iodide to form the dithiocarbazate. This process can be represented as follows:

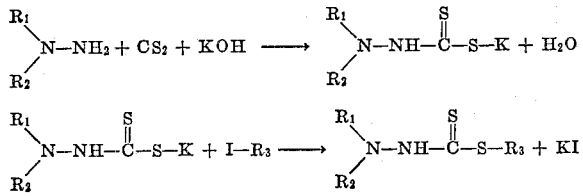

wherein $R_1$, $R_2$ and $R_3$ have the significance previously assigned.

The thionocarbazates can be prepared by reacting the appropriate xanthate with an appropriate chlorocarbonate to form the intermediate thionothiodiformate which can then be reacted with an appropriately unsubstituted hydrazine to yield the 3-substituted thionocarbazate. This process can be represented as follows:

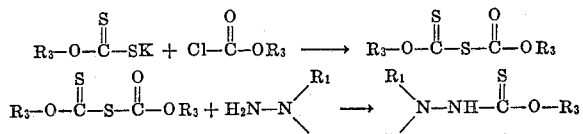

wherein $R_1$, $R_2$ and $R_3$ have the significance previously assigned.

The following examples illustrate methods of preparing the thiocarbazates used in this invention.

Example 1.—Ethyl 3-phenyldithiocarbazate

To a stirred solution of 21.6 g. of phenylhydrazine in 250 ml. of ethyl alcohol at about 0–10° C. was added 19 g. of carbon disulfide and 11.2 g. of potassium hydroxide dissolved in 100 ml. of water. The slurry was stirred and 31.2 g. of ethyl iodide added. Stirring was continued at ambient temperature for about 2 hrs., the mixture diluted with 1 liter of water and the crystalline crude product isolated by filtration. Recrystallization from aqueous ethanol gave 27 g. (63% yield) of the dithiocarbazate, melting at 127–128° C.

Example 2.—Ethyl 3-phenylthionocarbazate

Chloroacetic acid (0.1 mole) was dissolved in 100 ml. of water and neutralized with a theoretical quantity of sodium carbonate. An aqueous solution of potassium ethyl xanthate (0.1 mole) was added and after standing for 2 hrs., phenylhydrazine (0.1 mole) was added with vigorous stirring. Excess Dry Ice was then added, precipitating a white solid which was removed by filtration, washed with water, dried and then washed with n-hexane. Recrystallization of the solid from aqueous ethanol gave the crystalline thionocarbazate which melted at 70–71° C.

Example 3.—Ethyl 3-(3-nitrophenyl)thionocarbazate

To 46.6 g. of potassium ethyl xanthate dissolved in 250 ml. of water was added 31.4 g. of ethyl chloroformate dropwise at about 15–20° C. The mixture was stirred at ambient temperature for about 2 hrs. and then the lower layer separated and dried over anhydrous magnesium sulfate. The dried diethyl thionothiodiformate was added dropwise at about 15–20° C. to a solution of 3-nitrophenylhydrazine (15.3 g.) dissolved in 250 ml. of absolute ethanol. The mixture was stirred for about 2 hrs. and then poured into 1 liter of water. After about 5 min., crystals began to form which were isolated by filtration, washed with water and dried to give 21.5 g. (93%) of crude product. After recrystallization from a benzene-n-hexane mixture, the purified ethyl 3-(3-nitrophenyl)thionocarbazate melted at 100–101° C.

Example 4.—Ethyl 3-phenylthiolcarbazate

To a stirred solution of 10.8 g. of phenylhydrazine dissolved in 100 ml. of pyridine was added dropwise 12.5 g. of ethylchlorothiolcarbonate at about 10–15° C. Stirring was continued for 2 hrs. at ambient temperature and then the mixture poured into 500 ml. of dilute sulfuric acid (20%). The crystalline precipitate was removed by filtration, washed with water, then with n-hexane and dried to give 15.7 g. of crude product. Recrystallization from aqueous methanol gave 12.4 g. (63%) of pure product melting at 111–112.5° C.

Example 5.—Ethyl 3-(3-chlorophenyl)thiolcarbazate

To 15.9 g. of 3-chlorophenylhydrazine hydrochloride in 150 ml. of pyridine was added dropwise at about 15–20° C. a toluene solution of 0.1 mole of ethylchlorothiolcarbonate. Stirring was continued for about 2 hrs. at ambient temperature and the mixture was then poured into 600 ml. of dilute sulfuric acid (20%). The crystalline precipitate was removed by filtration, washed with water and dried to give 12.7 (55%) of the crude product. Recrystallization from n-hexane-benzene mixture gave the pure thiolcarbazate which melted at 101–102° C.

Example 6.—Phenyl 3-phenylthiolcarbazate

To a stirred solution of 0.2 mole of phenylhydrazine in 150 ml. of pyradine was added dropwise 0.2 mole of phenylchlorothiolcarbonate at about 10–15° C. stirring was continued at ambient temperature for 3 hrs. and the mixture then poured into 800 ml. of dilute sulfuric acid (20%). The crystalline precipitate was removed by filtration, washed with water and dried to give 47 g. (96%) of crude product. Recrystallization from n-hexane-benzene mixture gave the pure thiolcarbazate melting at 140–141° C.

Example 7.—Octyl-3-phenyl-3-methylthiolcarbazate

To a stirred solution of 1-methyl-1-phenylhydrazine (6.1 g.) in 50 ml. of pyridine was added dropwise 10.4 g. of n-octylchlorothiolcarbonate at about 15–20° C. over a period of 30 min. The mixture was stired for about 2 hrs. at ambient temperature and then poured into 300 ml. of cold dilute sulfuric acid (20%). An oily layer separated which crystallized after standing about 10 mins. The crystalline product was removed by filtration, washed with water and dried to give 10.3 of crude product. Recrystallization from n-hexane gave pure octyl 3-phenyl-3-methylthiolcarbazate melting at 55–56° C.

Example 8.—Octyl 3-(4-methylphenyl)thiolcarbazate

To a stirred mixture of 7.9 g. of 4-methylphenyl-hydrazine hydrochloride in 100 ml. of pyridine was added dropwise 10.4 g. of n-octylchlorothiolcarbonate at about 10–15° C. Stirring was continued at ambient temperature for about 2 hrs. and the mixture then poured into cold dilute sulfuric acid (10%). The crystalline precipitate was removed by filtration, washed with water and dried to give 13.9 g. of crude product. Recrystallization from n-hexane-benzene mixture gave the white crystalline thiolcarbazate melting at 110–111° C.

Example 9.—Phenyldithiocarbazic acid, phenylhydrazine salt

Prepared by method of Billman and Cleland, Organic Syntheses, Collective Vol. III, p. 360 (1955), M.P. 95–96° C.

The thiocarbazates are highly active against plant rust fungi and particularly cereal plant rust fungi. Thus as little as 0.1 pound applied uniformly to an acre of growing plants is effective although applications up to about 25 pounds per acre are sometimes desirable. The recommended application rates, however, are from about 0.25 pound to about 5 pounds of an active thiocarbazate per acre. Soil applications of the carbazates are also effective and are especially good against wheat rust.

The high activity of the thiocarbazates in controlling and eradicating cereal rust fungi only requires the application of very small amounts of the active ingredient distributed uniformly over a wide area. This is difficult to do employing the pure material. However, by increasing the bulk of the material, such as by mixing the thiocarbazate with an inert diluent or carrier, the application to growing plants can be achieved more readily.

There are thus also provided by this invention novel chemotherapeutic compositions containing one or more of the described active thiocarbazates intimately dispersed in an inert carrier or diluent for the intended use. Such carriers can be either solids such as talc, clay, diatomaceous earth, sawdust, calcium carbonate, and the like, or liquids such as water, kersene, acetone, benzene, toluene, and the like in which the active agent may be either dissolved or dispersed. Emulsifying agents are used to achieve a suitable emulsion if two immiscible liquids are used as the carrier. Wetting agents can also be used to aid in dispersing the active thiocarbazate in liquids used as a carrier in which the carbazate is not completely soluble.

The presently preferred composition for practicing this invention is an oil emulsion. Such compositions are particularly useful because the oil facilitates penetration of the compound into the plant and thus enhances activiity. Emulsifiable oil concentrates are generally first prepared since they are shipped more economically than dilute solutions. In addition to mineral oils, glycerol and wetting agents enhance penetration. In addition, abrasives, such as Carborundum, can be used as penetrating agents.

Typical satisfactory emulsifying or wetting agents (surface active agents), which may be ionic or non-ionic, that may be used in such compositions would include alkali metal-higher alkylarylsulfonates such as sodium dodecylbenzenesulfonate, fatty alcohol sulfates such as the sodium salts of the monoesters of sulfuric acid with n-aliphatic alcohols containing 8-18 carbon atoms, sodium salts of alkylnaphthalenesulfonic acids, long chain quaternary ammonium compounds, sodium salts of petroleum-derived alkylsulfonic acids, polyoxyethylene sorbitan mono-oleate and alkylaryl polyether alcohols.

A sticker can also be included in the compositions. Some stickers which can be used are latex (natural and synthetic), polyethylene polysulfide, fish oil soap, linseed oil soap, calcium caseinate, Triton B-1956 (a modified phthalic glycerol alkyd resin) and Du Pont Spreader-Sticker (sodium sulfates mixed long-chain alcohol fatty acids and esters, 88%).

The concentration of thiocarbazate in such compositions as applied to the growing cereal plants can be varied widely. For example, the thiocarbazate may be from about 0.1% to about 25% by weight of the composition. Such compositions may be applied at any rate which is practical considering the bulk involved for distribution of an effective amount of the thiocarbazate to the plants. The normal liquid bulk application is about 5 to 10 gallons per acre although from 1 to 100 gallons per acre is a practical range. When spraying from an airplane, usually not more than 10 galons per acre are used, with the normal rate being 1 to 3 gallons per acre. With a dust, an application rate of up to 40 pounds per acre is practical. Considering these volumes and weights, it is obvious that the concentration of thiocarbazate incorporated therein can be predetermined to effect the application of 0.1 to 10 pounds of thiocarbazate per acre.

For convenience in manufacture, shipping and storage, and to provide a more economical product to the ultimate consumer, it is desirable to market concentrates or premixes containing such as from about 10% to about 75% by weight of an active thiocarbazate intimately mixed with a carrier and other materials such as a surface active agent, stickers and the like, as is desired be present in the composition ultimately applied to plants.

Wettable powder concentrates are prepared by mixing an active thiocarbazate with an inert solid diluent such as fuller's earth, bentonite and hydrated aluminum magnesium silicate and a wetting agent. One representative wettable powder has the composition:

| | Percent (wt.) |
|---|---|
| Ethyl 3-(3-chlorophenyl)thiolcarbazate | 50 |
| Hydrated aluminum magnesium silicate | 40 |
| Sodium alkylnaphthalenesulfonate | 7 |
| Ligninsulfonate | 2 |
| Methyl cellulose | 1 |

A wettable powder such as this when mixed with water forms a dispersion which is particularly suitable for spray application. Enough water is generally used to provide sufficient thiocarbazate in a final volume of 1 to 10 gallons per acre.

Other additives such as lanolin or kerosene emulsions, or Tween 20 (a sorbitan monolaurate polyoxyalkylene derivative), stickers, and other auxiliary materials may be included in solid or liquid formulations to increase coverage and penetration of the active thiocarbazate. These substances are, in themselves, not active against cereal rust.

The following examples illustrate the effectiveness of the novel chemotherapeutic methods and compositions of this invention in controlling cereal rust.

EXPERIMENT 1

Several dispersions in water containing 2000 p.p.m., 400 p.p.m. and 80 p.p.m. of a carbazate as the active ingredient were prepared as follows: One drop of Emulphor EL (the reaction product of ethylene oxide and ricinoleic acid) was added to each 100 milligram of carbazate and the two ground together in a mortar with the addition of sufficient water to bring the carbazate into an emulsion. A kerosene emulsion (water containing 20% kerosene) was added to each composition at the rate of 5% to aid in plant coverage and penetration.

Two week old wheat plants were inoculated with spores of the leaf rust fungus, *Puccinia recondita*, and sprayed with the dispersions four days after inoculation. The plants were examined for disease control ten days after inoculation. Table I sets out the percent control of rust at concentrations of 2000 p.p.m., 400 p.p.m. and 80 p.p.m. of several carbazates tested in this manner.

TABLE I

| Compound | Percent Control of Rust | | |
|---|---|---|---|
| | 2,000 p.p.m. | 400 p.p.m. | 80 p.p.m. |
| Ethyl 3-phenylthionocarbazate | 100 | 95 | 0 |
| Ethyl 3-phenyldithiocarbazate | 95 | 20 | 0 |
| Ethyl 3-phenylthiolcarbazate | 100 | 100 | 80 |
| Ethyl 3-(3-nitrophenyl) thionocarbazate | 70 | 0 | 0 |
| 3-phenyldithiocarbazic acid, phenylhydrazine salt | 100 | 99 | 0 |
| Ethyl 3-(3-chlorophenyl) thiolcarbazate | 100 | 90 | 0 |
| Phenyl 3-phenylthiol-carbazate | 99 | 95 | 0 |
| 1-methyl-2-ketopropyl 3-phenyldithiocarbazate | 90 | 70 | 30 |

The results clearly show the effectiveness of the thiocarbazates in controlling cereal leaf rust. An examination of the plant leaves disclosed lesions at the site of infection, indicating the thiocarbazate had entered the plant and probably concentrated at the infected areas, "burning out" the fungus. No injury to healthy plant tissue from the described compositions was observed.

EXPERIMENT 2

The testing procedure of Experiment 1 was followed except that the plants were sprayed five days after inoculation and rated eight days after inoculation. At concentrations of 10,000 p.p.m., 50% control of the rust was obtained with octyl-3-phenyl-3-methylthiolcarbazate and octyl 3-(4-methylphenyl)thiolcarbazate. Actually, better results can be expected with these compounds since the test was run in a greenhouse which was too hot and in a season in which rust develops very rapidly.

Various changes and modifications of the invention can be made and, to the extent that such variations incorporate the spirit of this invention, they are intended to be included within the scope of the appended claims.

What is claimed is:

1. The method of controlling plant rust which comprises applying to the locus of a living plant a chemotherapeutic amount of a thiocarbazate of the formula $$\begin{array}{c} R_1 \\ \diagdown \\ N-NH-\overset{\overset{\displaystyle Y}{\|}}{C}-Z-R_3 \\ \diagup \\ R_2 \end{array}$$

wherein $R_1$ is a member of the group consisting of hydrogen and lower alkyl, $R_2$ is a member of the group consisting of phenyl, halophenyl, 3-nitrophenyl and lower alkyl phenyl, $R_3$ is a member of the group consisting of phenyl, phenylhydrazonium and lower alkyl, Y and Z are members of the group consisting of oxygen and sulfur, and at least one of Y and Z is sulfur.

2. The method of controlling plant rust which comprises applying to the locus of a living plant a chemotherapeutic amount of ethyl 3-phenylthionocarbazate.

3. The method of controlling plant rust which comprises applying to the locus of a living plant a chemotherapeutic amount of ethyl 3-phenyldithiocarbazate.

4. The method of controlling plant rust which comprises applying to the locus of a living plant a chemotherapeutic amount of ethyl 3-phenylthiolcarbazate.

5. The method of controlling plant rust which comprises applying to the locus of a living plant a chemotherapeutic amount of ethyl 3-(3-nitrophenyl)thionocarbazate.

6. The method of controlling plant rust which comprises applying to the locus of a living plant a chemotherapeutic amount of 3-phenyldithiocarbazic acid phenylhydrazine salt.

7. The method of controlling plant rust which comprises applying to the locus of a living plant a chemotherapeutic amount of ethyl 3-(3-chlorophenyl)thiolcarbazate.

8. The method of controlling plant rust which comprises applying to the locus of a living plant a chemotherapeutic amount of phenyl 3-phenylthiolcarbazate.

9. The method of controlling plant rust which comprises applying to the locus of a living plant a chemotherapeutic amount of 1-methyl-2-ketopropyl 3-phenyldithiocarbazate.

10. The method of controlling plant rust which comprises applying to the locus of a living plant a chemotherapeutic amount of octyl 3-phenyl-3-methylthiolcarbazate.

11. The method of controlling plant rust which comprises applying to the locus of a living plant a chemotherapeutic amount of octyl 3-(4-methylphenyl)thiolcarbazate.

12. The method of controlling fungi on plants which comprises applying to the plants a fungi toxic amount of a thiocarbazate having the formula $$\left[\begin{array}{c} H \\ \diagdown \\ N-NH-\overset{\overset{\displaystyle S}{\|}}{S}-S \\ \diagup \\ R \end{array}\right]^{-} \left[\begin{array}{c} H \quad H \\ HN-N- \\ H \end{array}\hspace{-2pt}\left\langle\!\!\!\bigcirc\!\!\!\right\rangle\right]^{+}$$

wherein R is a member selected from the group consisting of phenyl, 3-nitrophenyl and 3-methylphenyl.

13. A composition for the control of plant rust which comprises an effective chemotherapeutic amount of a thiocarbazate of the formula $$\begin{array}{c} R_1 \\ \diagdown \\ N-NH-\overset{\overset{\displaystyle Y}{\|}}{C}-Z-R_3 \\ \diagup \\ R_2 \end{array}$$

wherein $R_1$ is a member of the group consisting of hydrogen and lower alkyl, $R_2$ is a member of the group consisting of phenyl, halophenyl, 3-nitrophenyl and lower alkylphenyl, $R_3$ is a member of the group consisting of phenyl, phenylhydrazonium and lower alkyl, Y and Z are members of the group consisting of oxygen and sulfur and at least one of Y and Z is sulfur, a sticking agent and an inert carrier.

14. A composition according to claim 13 including a surface active agent.

15. A composition according to claim 14 in liquid form.

16. A composition for the control of plant rust which comprises an effective chemotherapeutic amount of a thiocarbazate of the formula $$\begin{array}{c} R_1 \\ \diagdown \\ N-NH-\overset{\overset{\displaystyle O}{\|}}{C}-S-R_3 \\ \diagup \\ R_2 \end{array}$$

wherein $R_1$ is a member of the group consisting of hydrogen and lower alkyl, $R_2$ is a member of the group consisting of phenyl, halophenyl, 3-nitrophenyl and lower alkylphenyl and $R_3$ is a member of the group consisting of phenyl, phenylhydrazonium and lower alkyl, a surface active agent and an inert carrier.

17. A composition for the control of plant rust which comprises an effective chemotherapeutic amount of a thiocarbazate of the formula $$\begin{array}{c} R_1 \\ \diagdown \\ N-NH-\overset{\overset{\displaystyle S}{\|}}{C}-S-R_3 \\ \diagup \\ R_2 \end{array}$$

wherein $R_1$ is a member of the group consisting of hydrogen and lower alkyl, $R_2$ is a member of the group consisting of phenyl, halophenyl, 3-nitrophenyl and lower alkylphenyl and $R_3$ is a member of the group consisting of phenyl, phenylhydrazonium and lower alkyl, a surface active agent and an inert carrier.

18. A composition for the control of plant rust which comprises an effective chemotherapeutic amount of ethyl 3-phenyldithiocarbazate, a surface active agent, and an inert carrier.

19. A composition for the control of plant rust which comprises an effective chemotherapeutic amount of ethyl 3-phenylthiolcarbazate, a surface active agent, and an inert carrier.

20. A composition for the control of plant rust which comprises an effective chemotherapeutic amount of ethyl 3-(3-nitrophenyl)thionocarbazate, a surface active agent, and an inert carrier.

21. A composition for the control of plant rust which comprises an effective chemotherapeutic amount of 3-phenyldithiocarbazic acid phenylhydrazine salt, a surface active agent, and an inert carrier.

22. A composition for the control of plant rust which comprisse an effective chemotherapeutic amount of ethyl 3-(3-chlorophenyl)thiolcarbazate, a surface active agent, and an inert carrier.

23. A composition for the control of plant rust which comprises an effective chemotherapeutic amount of phenyl 3-phenylthiolcarbazate, a surface active agent, and an inert carrier.

24. A composition for the control of plant rust which comprises an effective chemotherapeutic amount of 1-methyl-2-ketopropyl 3-phenyldithiocarbazate, a surface active agent, and an inert carrier.

25. A composition for the control of plant rust which comprises an effective chemotherapeutic amount of octyl 3-phenyl-3-methylthiolcarbazate, a surface active agent, and an inert carrier.

26. A composition for the control of plant rust which comprises an effective chemotherapeutic amount of octyl 3-(4-methylphenyl)thiolcarbazate, a surface active agent, and an inert carrier.

27. A wettable powder for the control of plant rust which comprises a suitable inert powdered solid carrier, a surface active agent, and a thiocarbazate of the formula

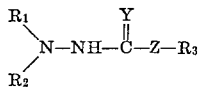

where $R_1$ is a member of the group consisting of hydrogen and lower alkyl, $R_2$ is a member of the group consisting of phenyl, halophenyl, 3-nitrophenyl and lower alkylphenyl, $R_3$ is a member of the group consisting of phenyl, phenylhydrazonium and lower alkyl, Y and Z are members of the group consisting of oxygen and sulfur and at least one of Y and Z is sulfur.

28. An emulsifiable oil concentrate containing a thiocarbazate of the formula

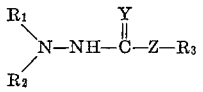

wherein $R_1$ is a member of the group consisting of hydrogen and lower alkyl, $R_2$ is a member of the group consisting of phenyl, halophenyl, 3-nitrophenyl and lower alkylphenyl, $R_3$ is a member of the group consisting of phenyl, phenylhydrazonium and lower alkyl, Y and Z are members of the group consisting of oxygen and sulfur and at least one of Y and Z is sulfur.

References Cited
UNITED STATES PATENTS

| | | | |
|---|---|---|---|
| 2,060,733 | 11/1936 | Hunt | 260—455 |
| 2,160,880 | 6/1939 | Loane | 260—455 |
| 2,863,899 | 12/1958 | Harris | 260—455 |
| 2,882,291 | 4/1959 | Harmon | 260—455 |
| 2,900,298 | 8/1959 | Jaworski | 167—30 |
| 2,911,336 | 11/1959 | Urbschat | 167—30 |
| 2,914,547 | 11/1959 | Gaertner | 260—429.9 |
| 2,920,994 | 1/1960 | Epperly | 167—30 |
| 2,988,475 | 6/1961 | Gaertner | 167—30 |

ALBERT T. MEYERS, *Primary Examiner.*

S. J. FRIEDMAN, *Assistant Examiner.*